United States Patent [19]

Yamaoka et al.

[11] Patent Number: 5,608,817
[45] Date of Patent: Mar. 4, 1997

[54] OPTICAL MEASURING METHOD

[75] Inventors: Naoji Yamaoka; Koji Oda, both of Sayama, Japan

[73] Assignee: Honda Giken Kogyo Kabushiki Kaisha, Tokyo, Japan

[21] Appl. No.: 338,193

[22] Filed: Nov. 9, 1994

[30] Foreign Application Priority Data

| Nov. 18, 1993 | [JP] | Japan | 5-289362 |
| Dec. 14, 1993 | [JP] | Japan | 5-312950 |
| Dec. 14, 1993 | [JP] | Japan | 5-312960 |

[51] Int. Cl.$^6$ .............. G06K 9/00; G01B 11/24
[52] U.S. Cl. ............. 382/152; 382/141; 356/375; 356/376
[58] Field of Search .............. 382/141, 152, 382/154, 286, 288, 146; 348/135, 136; 356/375, 376

[56] References Cited

U.S. PATENT DOCUMENTS

| 5,129,010 | 7/1992 | Higuchi et al. | 382/141 |
| 5,280,542 | 1/1994 | Ozeki et al. | 382/154 |
| 5,311,289 | 5/1994 | Yamaoka et al. | 356/375 |

FOREIGN PATENT DOCUMENTS

63-61107  3/1988  Japan.

Primary Examiner—Leo Boudreau
Assistant Examiner—Bhavesh Mehta
Attorney, Agent, or Firm—Armstrong, Westerman Hattori, McLeland & Naughton

[57] ABSTRACT

An optical measuring method for measuring a position of an edge portion of a workpiece uses an optical measuring apparatus having a projector for radiating a slit light on the workpiece and an image sensing device for picturing an optical cutting image drawn by the slit light radiated on the workpiece. The measuring is made from a pictured optical cutting image on a screen of the image sensing device. In the method, coordinates of an end point on a side of an edge portion of the pictured optical cutting image are obtained. Windows are set in predetermined two positions in that portion of the pictured optical cutting image which extends straight. Coordinates of respective centers of gravity of the pictured optical cutting image inside both the windows are obtained. An equation of a first straight line which passes through both the centers of gravity and an equation of a second straight line which crosses the first straight line at right angles and which passes through the end point are obtained. Coordinates of a crossing point of both the straight lines are obtained.

5 Claims, 5 Drawing Sheets

OPTICAL MEASURING METHOD

BACKGROUND OF THE INVENTION

1. Field of the Invention

The present invention relates to an optical measuring method for measuring a position of an edge portion of a workpiece or a position of a stepped edge portion of a workpiece of stepped shape or for measuring a gap or a clearance and a difference in level or a step between the edge portions of adjoining two workpieces.

2. Description of Related Art

Figure 1A:
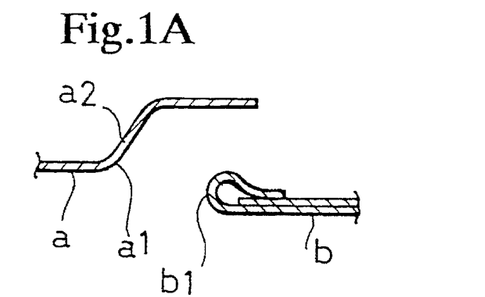
FIGS. 1A through 1D are sectional views of each portion of a motor vehicle body.
Figure 1B:
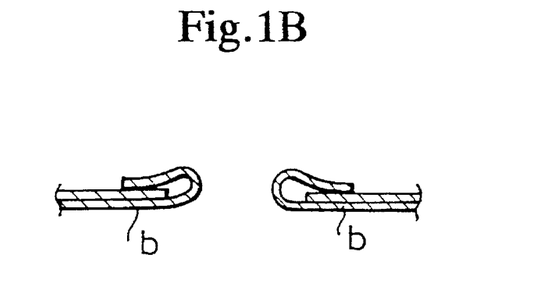
Figure 1C:
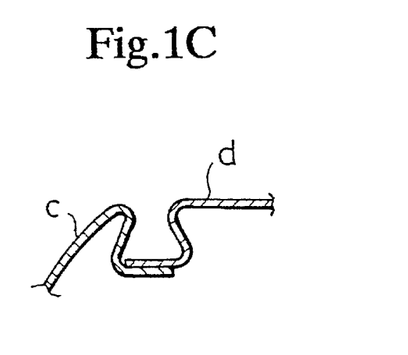
Figure 1D:
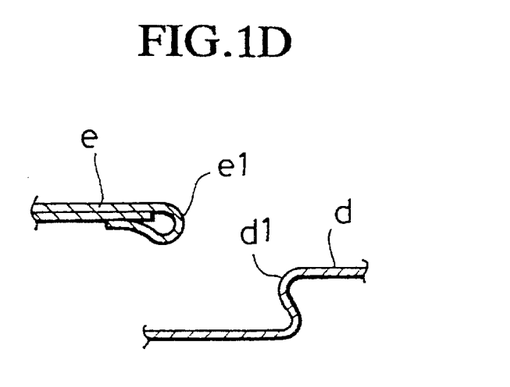

In a motor vehicle body there are positions where edge portions of two workpieces lie close to each other. The following are some such examples, i.e., the gap between a front fender "a" and a door b as shown in FIG. 1A, the gap between doors b, b on the front side and on the rear side, respectively, as shown in FIG. 1B, the gap between a side panel c and a roof panel d as shown in FIG. 1C, and the gap between the roof panel d and a tail gate e as shown in FIG. 1D. In order to secure an assembling accuracy of the motor vehicle body, it is necessary to control the gap and the difference in level between edge portions of two adjoining workpieces.

Conventionally, these gaps and the differences in level have been measured in a contact method by using a dial gauge or the like. This method has, however, a disadvantage in that the motor vehicle body may be subjected to scratching.

Further, there is known a method in which is used an optical measuring apparatus having a projector for radiating a slit light on a workpiece and an image sensing device for picturing an optical cutting image drawn by the slit light radiated on the workpiece, and in which are measured the shape and the position of the workpiece from a pictured optical cutting image on a screen of the image sensing device. There is known in Japanese Published Unexamined Patent Application No. 61107/1988 a method of measuring the difference in level between a roof panel and a slide roof by utilizing the above-described method. In this method the difference in level between the roof panel and the slide roof is measured from an amount of deviation between the line on the side of the roof panel and the line on the side of the slide roof in the pictured optical cutting image.

It may also be considered to measure the difference in level between edge portions of adjoining two workpieces by using the above-described optical measuring apparatus. In this case, if an optical cutting image is pictured by radiating the slit light so as to bridge the edge portions of the two workpieces, there will appear on a screen a pictured optical cutting image which terminates at the edge portion of one of the workpieces and a pictured optical cutting image which terminates at the edge portion of the other of the workpieces, provided each of the edge portions is bent at an angle larger than 90° such as the edge portion of the door b, the side panel c, the roof panel d and the tail gate e. It becomes thus possible to measure the gap and the difference in level from the position of an end portion on the side of each of the edge portions of the optical cutting image.

However, the end portion of the pictured optical cutting image becomes tapered arcuate in shape with a curvature corresponding to the bent radius of the edge portion. It is therefore impossible to carry out the measurement by locating the position of the end portion to a single point. Consequently, it is difficult to measure the position of the edge portion at a higher accuracy.

Further, in case of a workpiece of stepped shape having a stepped portion a2 like the front fender "a" which is bent at an angle below 90°, there will appear on the screen of the image sensing device a pictured optical cutting image of stepped shape corresponding to the cross-sectional shape of the workpiece. It is therefore possible to measure the position of the stepped edge portion a1 of the workpiece from the position of the bent portion in the pictured optical cutting image.

In this case, however, the bent portion of the pictured optical cutting image also becomes arcuate in shape with a curvature corresponding to the bent radius of the stepped edge portion. It is thus impossible to measure the position of the stepped edge portion by locating the position of the bent portion to a single point on the screen. It is therefore difficult to measure the position of the stepped edge portion at a higher accuracy.

In view of the above-described disadvantages, the present invention has an object of providing an optical measuring method in which the above-described problems can be solved and in which the position of an edge portion of a workpiece or a stepped edge portion of a workpiece of stepped shape can be measured at a higher accuracy and, further, in which the gap and the difference in level between the edge portions can be accurately measured.

SUMMARY OF THE INVENTION

In order to enable to measure the position of an edge portion of a workpiece at a higher accuracy, the first feature of the present invention is an optical measuring method for measuring a position of an edge portion of a workpiece by using an optical measuring apparatus having a projector for radiating a slit light on the workpiece and an image sensing device for picturing an optical cutting image drawn by the slit light radiated on the workpiece, the measuring being made from a pictured optical cutting image on a screen of the image sensing device. The method comprises the steps of: obtaining coordinates of an end point on a side of an edge portion of the pictured optical cutting image; setting windows in predetermined two positions in that portion of the pictured optical cutting image which extends straight, thereby obtaining coordinates of respective centers of gravity of the pictured optical cutting image inside both the windows; obtaining an equation of a first straight line which passes through both the centers of gravity and an equation of a second straight line which crosses the first straight line at right angles and which passes through the end point; and obtaining coordinates of a crossing point of both the straight lines.

The first line which passes through the centers of gravity inside the windows set in two positions of that portion of the pictured optical cutting image which extends straight accurately represents the normal plane or ordinary surface of the workpiece. The crossing point between the second straight line which passes through the end point on the side of the edge portion of the pictured optical cutting image and the first straight line becomes a point which corresponds to a corner portion when the workpiece is bent at right angles relative to its normal plane. Therefore, the position of the edge portion can be accurately measured based on the crossing point.

In case a projection and a depression appear on an outer edge of the bent edge portion of the pictured optical cutting image due to noises or the like, there is a possibility that the projected portion on the outer edge is detected as the end point of the pictured optical cutting image. In order to enable to obtain the coordinates of the substantial end point of the pictured optical cutting image without being influenced by the projection and the depression of this kind, the following arrangement may be employed. Namely, that coordinate axis on the screen which is substantially parallel with a longitudinal direction of the pictured optical cutting image is defined to be a first axis and a coordinate axis which crosses the first axis at right angles is defined to be a second axis. A window which extends outwards along the first axis from an end portion of the pictured optical cutting image is set. A center of gravity of a blank space on the outside of the pictured optical cutting image within the window is obtained. The coordinate value, in the direction of the second axis, of this center of gravity is made to be the coordinate value of the end point in the direction of the second axis. Then, the following value may be made the coordinate value in the direction of the first axis, i.e., the value to be obtained by subtracting a coordinate value, in the direction of the first axis, of an outer side in the direction of the first axis of the window from a value to be obtained by doubling the coordinate value, in the direction of the first axis, of the center of gravity.

Namely, the distance in the direction of the first axis between the outer side of the window in the direction of the first axis and the center of gravity of the blank space inside the window should be half the distance in the direction of the first axis between the outer side of the window and the substantial end point of the pictured optical cutting image. Therefore, the coordinate value, in the direction of the first axis, of the substantial end point of the pictured optical cutting image can be calculated in the above-described method. Further, even if there appears a projection and a depression on the end portion of the outer edge of the pictured optical cutting image, the area of the portion of this projection and the depression is very small and, therefore, the position of the center of gravity of the blank space inside the window makes little or no change. The coordinates of the end point can thus be accurately measured without dispersion.

In case measurement is made of the gap and the difference in level between the two adjoining workpieces such as between the doors b, b on the front side and on the rear side, respectively, as shown in FIG. 1B, between the side panel c and the roof panel d as shown in FIG. 1C, and between the roof panel d and the tail gate e as shown in FIG. 1D, the slit light may be radiated so as to bridge the edge portions. Then, image processing may be carried out according to the above-described first feature with respect to each of the two pictured optical cutting images which correspond to the two workpieces and appear on the screen of the image sensing device, thereby obtaining the coordinates of the above-described crossing point.

In order to enable to measure the position of the stepped edge portion of a workpiece of stepped shape at a higher accuracy, the second feature of the present invention is an optical measuring method for measuring a stepped edge portion of a workpiece of stepped shape by using an optical measuring apparatus having a projector for radiating a slit light on the workpiece and an image sensing device for picturing an optical cutting image drawn by the slit light radiated on the workpiece, the measuring being made from a pictured optical cutting image on a screen of the image sensing device. The method comprises the steps of: setting windows in predetermined two positions respectively in a first straight line portion and a second straight line portion which extend in opposite directions with a stepped portion appearing in the pictured optical cutting image being positioned therebetween, thereby obtaining centers of gravity of the optical cutting image inside each of the windows; obtaining an equation of a first straight line which passes through the centers of gravity inside the windows in the two positions set in the first straight line portion and an equation of a second straight line which passes through the centers of gravity inside the two positions set in the second straight line portion; obtaining coordinates of an end point on a side of the stepped portion of the pictured optical cutting image positioned on the first straight line and coordinates of an end point on a side of the stepped portion of the pictured optical cutting image positioned on the second straight line; setting windows in predetermined two positions in the stepped portion based on a segment of a line connecting both the end points, thereby obtaining coordinates of centers of gravity of the pictured optical cutting image inside each of the windows; obtaining an equation of a third straight line which passes through the centers of gravity inside the windows in the two positions set in the stepped portion; and obtaining coordinates of a crossing point of at least one of the first straight line and the second straight line, and the third straight line.

The respective inclinations and the positions of the workpiece surface on the side of one end of the stepped surface of the workpiece and the workpiece surface on the side of the other end thereof are represented by the first straight line and the second straight line. The inclination and the position of the stepped surface are represented by the third straight line. The crossing point between the first straight line or the second straight line and the third straight line becomes a point which corresponds to the corner portion when one end or the other end of the stepped surface of the workpiece is bent without giving it a curvature. The position of the stepped edge portion can be accurately measured based on this crossing point as the measuring reference point.

Even if the bending angle of the stepped portion of the workpiece varies or the workpiece deviates in position, the segment of the line connecting the above-described both end points becomes a line which falls or lies within the stepped portion of the pictured optical cutting image. By setting the windows based on this segment of the line, it becomes possible to set the windows without dispersion in the predetermined portions of the stepped portion. Therefore, the third line to be obtained based on the centers of gravity inside these windows correctly represents the inclination and the position of the stepped surface of the workpiece. The measuring accuracy of the stepped portion can thus be improved.

In case there is measured the gap between the stepped edge portion of the first workpiece of stepped shape such as the front fender "a" as shown in FIG. 1A and the edge portion of an adjoining second workpiece such as the door b, the following procedures may be followed. Namely, a slit light is radiated so as to bridge the stepped portion of the first workpiece and the edge portion of the second workpiece. Image processing is made according to the above-described second feature with respect to that first pictured optical cutting image appearing on the screen which corresponds to the first workpiece. Coordinates are obtained of the crossing point of the first straight line which coincides with one of the straight line portions of the first pictured optical cutting image which extends in the direction away from the second pictured optical cutting image corresponding to the second workpiece and the third straight line which corresponds to the stepped portion of the first pictured optical cutting image. Further, image processing is carried out according to the above-described first feature with respect to the second pictured optical cutting image to thereby obtain the coordinates of the crossing point of the straight line which coincides with the straight line portion of the second pictured optical cutting image and the straight line which passes through the end point on the side of the edge portion of the second pictured optical cutting screen image and which crosses at right angles the above-described straight line.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

An explanation will now be made about a method of measuring a gap (or a clearance) and a difference in level (or a step) between edge portions in case where the edge portions of adjoining two workpieces are both bent at an angle above 90°, with reference to FIG. 1D in which measurement is made of the gap and the difference in level between an edge portion d1 of a roof panel d and an edge portion e1 of a tail gate e.

Figure 2:
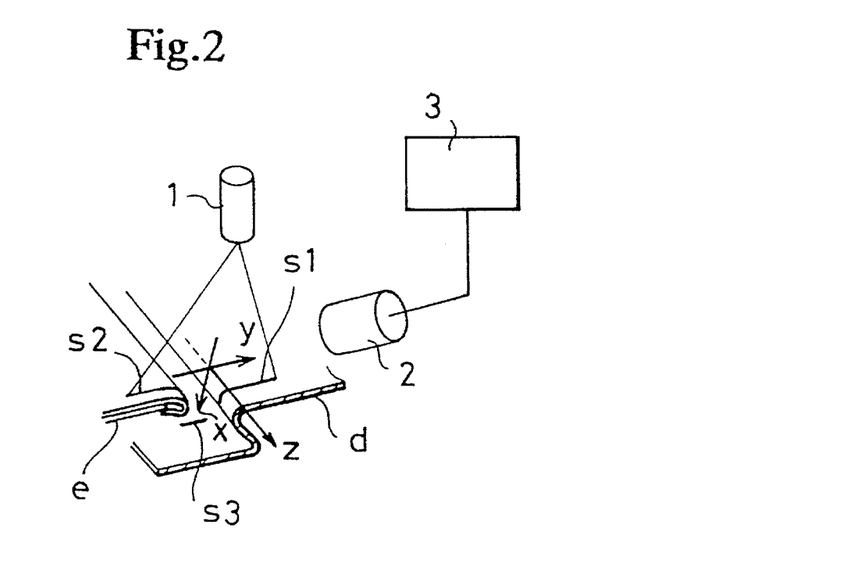
FIG. 2 is a perspective view showing a general arrangement of an optical measuring apparatus.

Referring to FIG. 2, numeral 1 denotes a projector for radiating a slit light and numeral 2 denotes an image sensing device made up of a CCD camera or the like. The projector 1 and the image sensing device 2 are mounted in a predetermined positional relationship on a measuring head (not illustrated) to be attached to a moving end of a moving mechanism such as a robot or the like such that an optical axis of the image sensing device 2 slantingly crosses, at a predetermined angle (e.g., 45°), a light plane of the slit light to be radiated from the projector 1.

After moving the measuring head to a predetermined measuring position which opposes or faces an adjoining portion of the roof panel d and the tail gate e, the slit light is radiated from the projector 1 so as to bridge the roof panel d and the tail gate e. The portion radiated by the slit light is pictured by means of the image sensing device 2.

Figure 3:
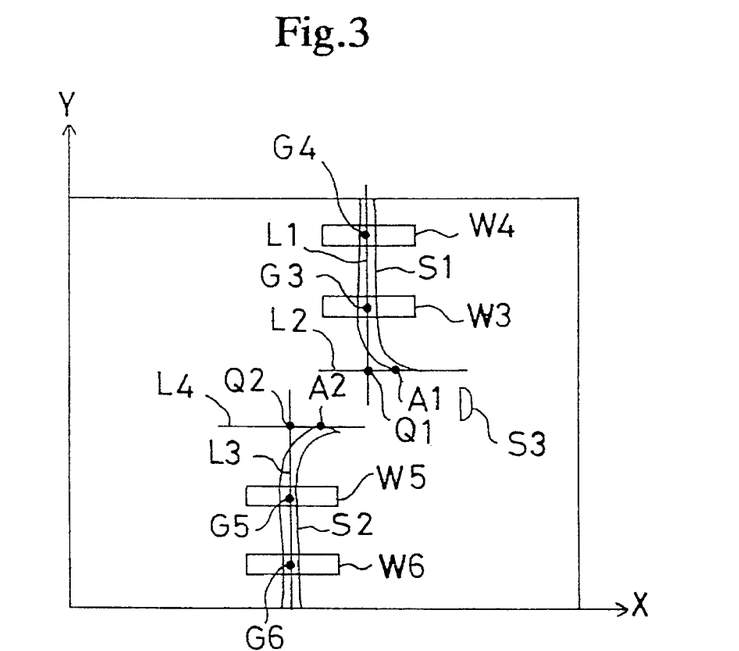
FIG. 3 is a diagram showing an image processing on a screen according to the present invention.

When the slit light is radiated as described above, there will be drawn optical cutting images s1, s2, s3 respectively on the roof panel d, on the tail gate e and on that rear flange of the roof panel d which faces or lies to face the gap between the roof panel d and the tail gate e. There will appear three pictured optical cutting images S1, S2, S3 on the screen of the image sensing device 2 as shown in FIG. 3. Each of these pictured optical cutting images is pictured such that it becomes substantially parallel with a Y-axis which is the vertical coordinate axis of the screen.

Image signals from the image sensing device 2 are transmitted to an image processing device 3 which is made up of a computer. The gap and the difference in level between the edges d1, e1 respectively of the roof panel d and the tail gate e are measured by the image processing device 3.

In this measurement there are selected two pictured optical cutting images of large image area as pictured optical cutting images to be processed first. These two pictured optical cutting images are namely a pictured optical cutting image S1 which corresponds to the optical cutting image s1 on the roof panel d and a pictured optical cutting image S2 which corresponds to the optical cutting image s2 on the tail gate e. Then, there are obtained coordinates of end points on the side of the edge portions of the respective pictured optical cutting images S1, S2, i.e., an end point A1 on a lower side, in the Y-axis direction, of the pictured optical cutting image S1 and an end point A2 on an upper side, in the Y-axis direction, of the pictured optical cutting image S2.

By the way, the end portion on the side of the edge portion of each of the pictured optical cutting images S1, S2 will be a tapered arcuate shape having a curvature corresponding to a bent radius of the edge portion. Should a projection or a depression appear on an outer edge of the end portion due to noises or the like, the projected portion will be detected as the end point. Therefore, it becomes necessary to make some kind of arrangement in order to obtain coordinates of a correct or normal end point which coincides with a normal shape of the end portion. An explanation will now be made about this arrangement with reference to FIG. 4. First, an outermost point in the Y-axis direction of each of the pictured optical cutting images S1, S2 is detected as a provisional end point B1, B2. Should a projection or a depression due to noises appear on an outer edge end portion of each of the pictured optical cutting images S1, S2, this projected portion is detected as a provisional end point B1, B2. Then, based on the provisional end point B1, B2 there is respectively set a window W1, W2 which extends outwards in the Y-axis direction. A center of gravity G1, G2 of a blank space on an outside of the pictured optical cutting image S1, S2 within the windows W1, W2 is detected. Even if a projection or a depression may appear on the outer edge end portion, the center of gravity G1, G2 makes little or no change in position because the area of the blank space is far larger than the projection or the depression.

Figure 4:
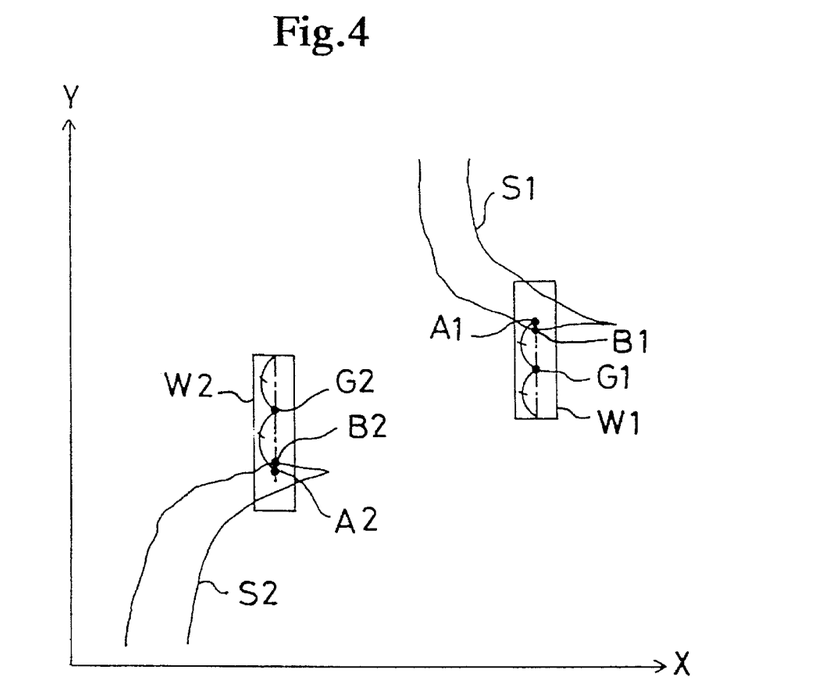
FIG. 4 is a diagram showing an image processing to obtain an end point of a pictured optical cutting image.

Here, the distance between an outer or external side in the Y-axis direction of the window W1, W2 and the normal end point A1, A2 should become two times the distance between the outer side and the center of gravity G1, G2. Therefore, the following relationship can be established among the Y-axis coordinate value AY of the normal end point A1, A2, Y-axis coordinate value WY of the outer side of the window W1, W2, and the Y-axis coordinate value GY of the center of gravity G1, G2

$$AY-WY=2(GY-WY)$$

The Y-axis coordinate value of the normal end point A1, A2 can therefore be obtained by the following formula $$AY=2GY-WY$$

The X-axis coordinate value of the end point A1, A2 is regarded to be the X-axis coordinate value of the center of gravity G1, G2.

After the coordinates of the end point A1, A2 of the pictured optical cutting image S1, S2 have been obtained as described above, windows W3, W4 in two predetermined positions are set, based on the end point A1, in that portion of the pictured optical cutting image S1 which extends straight to thereby obtain coordinates of the center of gravity G3, G4 of the pictured optical cutting image S1 inside both the windows W3, W4. Then, there is obtained an equation of a line which passes through both the centers of gravity G3, G4, i.e., a straight line L1 which represents the straightly extending portion of the pictured optical cutting image S1. Furthermore, there is obtained an equation of a straight line L2 which crosses the straight line L1 at right angles and which passes through the end point A1. Coordinates of a crossing point Q1 of the straight lines L1 and L2 are obtained. Similarly, windows W5, W6 in two predetermined positions are set, based on the end point A2, in that portion of the pictured optical cutting image S2 which extends straight to thereby obtain coordinates of the centers of gravity G5, G6 of the pictured optical cutting image S2 inside both the windows W5, W6. Then, there is obtained an equation of a straight line which passes through both the centers of gravity G5, G6, i.e., a straight line L3 which represents the straightly extending portion of the pictured optical cutting image S2. Furthermore, there is obtained an equation of a straight line L4 which crosses the straight line L3 at right angles and which passes through the end point A2. Coordinates of a crossing point Q2 of the straight lines L3 and L4 are obtained.

Each of the crossing points Q1, Q2 will be a point that corresponds to the corner portion when the roof panel d and the tail gate e are respectively bent at right angles at the edge portion. The position of each of the edge portions on the screen of the image sensing device 2 can thus be accurately identified by each of the crossing points Q1, Q2.

From the coordinate values of each of the crossing points Q1, Q2 on the screen, spatial coordinate values of each of the points q1, q2 corresponding to each of the crossing points Q1, Q2 on the slit light plane are calculated.

Figure 5:
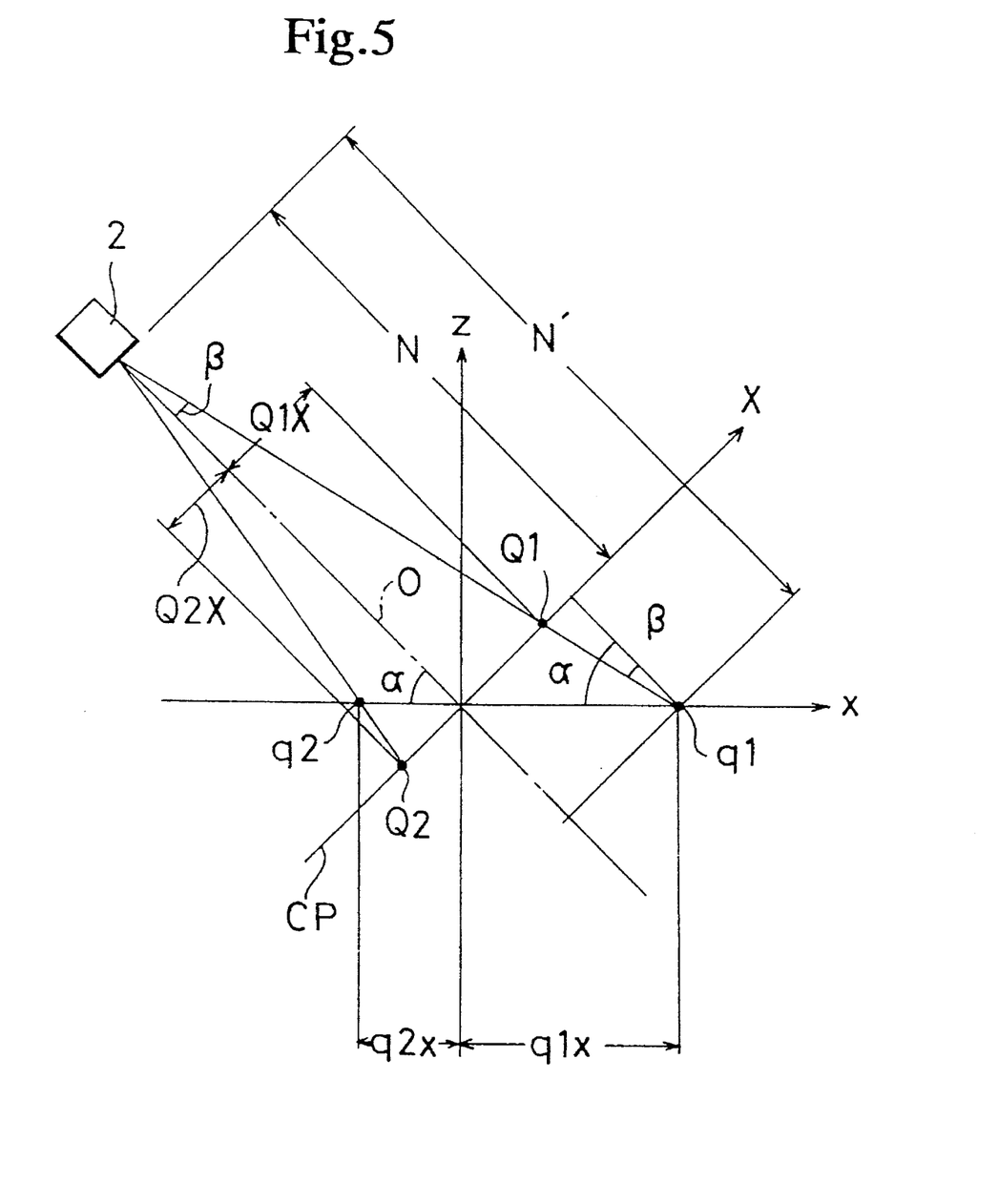
FIG. 5 is a diagram showing the relationship between a point on the screen and the corresponding point on a slit light plane.

The principle of this calculation will now be explained with reference to FIG. 5. As shown in FIG. 2, suppose a spatial coordinate system which has an origin in the crossing point of an optical axis 0 of the image sensing device 2 relative to the slit light plane and which is made up of an x-axis and a y-axis, both on the slit light plane, and a z-axis which crosses the slit light plane at right angles. In FIG. 5, CP represents a plane of projection of the screen of the image sensing device 2 onto the spatial coordinate system. The coordinates on the screen of each point on the slit light plane will be the coordinates of a crossing point, on the plane of projection CP, of a line of sight of each of said point as seen from the image sensing device 2. An X-axis and a Y-axis are taken on the screen (the plane of projection CP) by setting as an origin that point on the screen which corresponds to the origin in the spatial coordinate system, i.e., the central point of the screen. Then, the following relationship can be established between the coordinates (Q1X, Q1Y) on the screen of the crossing point Q1 and the spatial coordinates (q1x, q1y) of that point q1 on the slit light plane which corresponds to the crossing point Q1.

Namely, let the angle of inclination of the optical axis O of the image sensing device 2 relative to the slit light plane be $\alpha$ ($\alpha$ is set to a predetermined value by calibration), and the angle of inclination of the line of sight onto point q1 relative to the optical axis O be $\beta$. Then, the following equation can be obtained.

$$Q1X = q1x \cdot \sin\alpha - q1x \cdot \cos\alpha \cdot \tan\beta \qquad (1)$$

Let the distance between the image sensing device 2 and the slit light plane be N (N is set to a predetermined value by calibration). Then, the following equation can be obtained.

$$\tan\beta = Q1X/N \qquad (2)$$

If a rearrangement of q1x is made by substituting formula (2) into formula (1), the following formula can be obtained.

$$q1x = Q1X/\{\sin\alpha - \cos\alpha \cdot (Q1X/N)\}$$

The ratio of q1y to Q1Y is equal to the ratio of the distance N' between the leg extended from point q1 to the optical axis O and the image sensing device 2 to the distance N. Here, since $$N' = N + q1x \cdot \cos\alpha$$

the following can be obtained.

$$q1y = Q1Y\{1 + (q1x \cdot \cos\alpha)/N\}$$

Thus, the spatial coordinates of that point q1 on the slit light plane which corresponds to the crossing point Q1 can be calculated from the coordinates on the screen of the crossing point Q1.

The spatial coordinates (q2x, q2y) of that point q2 on the slit light plane which corresponds to the above-described crossing point Q2 can similarly be calculated from the coordinates on the screen of the crossing point Q2 by the following formulas.

$$q2x = Q2X/\{\sin\alpha - \cos\alpha \cdot (Q2x/N)\}$$

$$q2y = Q2Y\{1 + (q2x \cdot \cos\alpha)/N\}$$

The gap between the edge portions and the difference in level between the edge portions can be accurately measured respectively from the difference between the y-axis coordinate values of point q1 and point q2 and the difference between the x-axis coordinate values of point q1 and point q2.

An explanation has hitherto been made about the measurement of the gap and the difference in level between the edge portions of the roof panel d and the tail gate e. Measurement can also be made, in a manner similar to that as described above, of the gap between edge portions of the doors b, b as shown in FIG. 1B and of the gap and the difference in level between the side panel c and the roof panel d as shown in FIG. 1C.

Next, an explanation will now be made about the method of measuring the gap and the difference in level between a stepped edge portion of a workpiece of a stepped shape having a stepped portion bent at an angle smaller than 90° and that edge portion of an adjoining workpiece which is bent at an angle larger than 90°, with reference to an example of measuring the gap and the difference in level between a stepped edge portion a1 of the front fender "a" and an edge portion b1 of the door b as shown in FIG. 1A.

Figure 6:
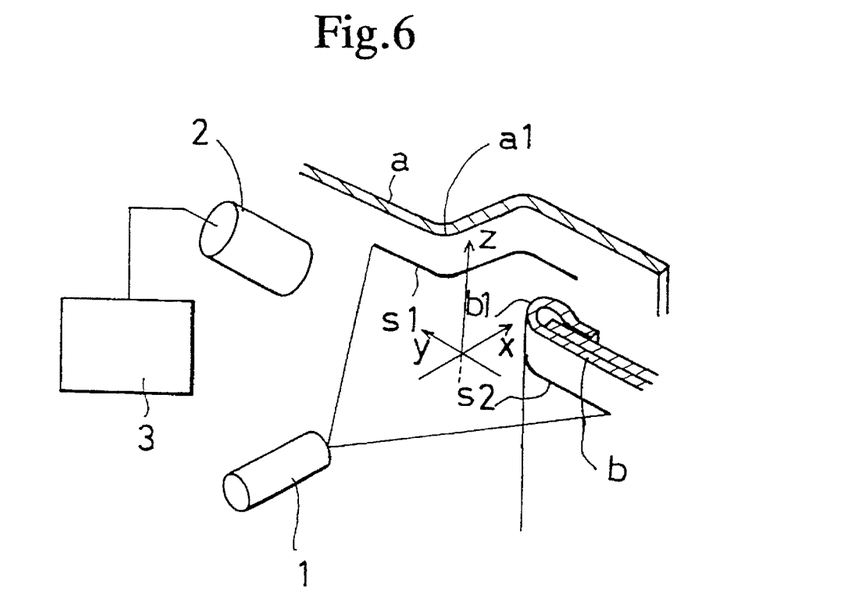
FIG. 6 is a perspective view showing the condition of an optical measuring apparatus when the gap and the difference in level between edge portions of a front fender and a door are measured.

In carrying out the measuring, the measuring head is moved to a position which faces or opposes the adjoining portion of the front fender "a" and the door b. Then, as shown in FIG. 6, a slit light is radiated from the projector 1 so as to bridge the front fender "a" and the door b. The optical cutting image s1 to be drawn on the front fender "a" and the optical cutting image s2 to be drawn on the door b are pictured by the image sensing device 2.

Figure 7:
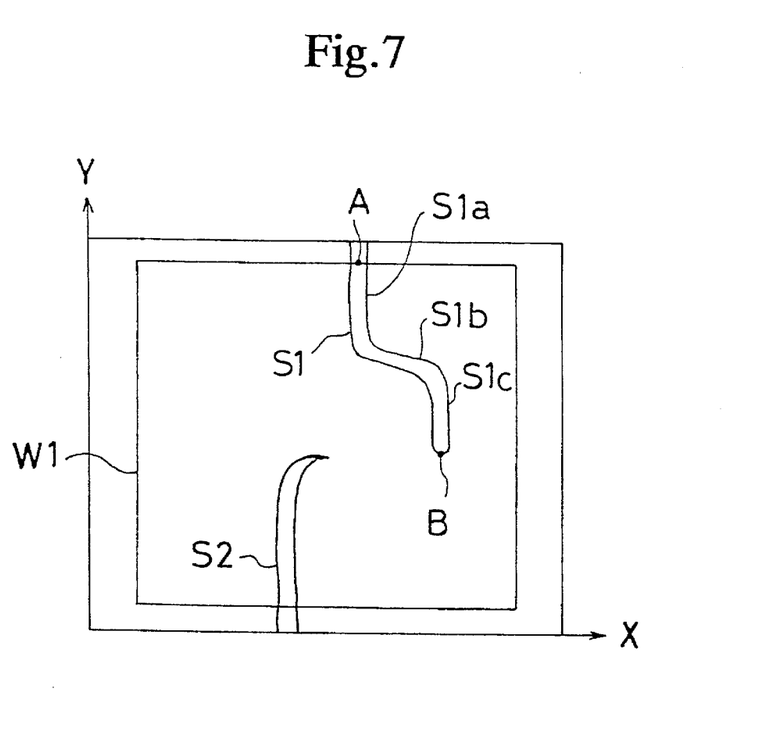
FIG. 7 is a diagram showing the screen picturing the condition in FIG. 6.

On the screen of the image sensing device 2 there appear, as shown in FIG. 7, a pictured optical cutting image S1 which corresponds to the optical cutting image s1 on the front fender "a" and a pictured optical cutting image S2 which corresponds to the optical cutting image s2 on the door b. The pictured optical cutting image S1 will become a stepped shape having a first straight portion S1a which corresponds to an ordinary surface of the front fender "a", a stepped portion S1b which corresponds to the stepped surface a2 of the front fender "a", and a second straight portion S1c which corresponds to a flange portion lying inwards of the stepped surface.

The image sensing device 2 pictures the optical cutting images s1, s2 such that the longitudinal direction of straight line portions S1a, S1c of the pictured optical cutting image S1 and of the pictured optical cutting image S2 lie substantially parallel with the Y-axis which is the vertical coordinate axis of the screen.

The image signals of the image sensing device 2 are transmitted to the image processing device 3. The position of the stepped edge portion a1 of the front fender "a" and the position of the edge portion b1 of the door b are measured by the image processing device 3 and the gap and the difference in level between the two are measured.

Figure 8A:
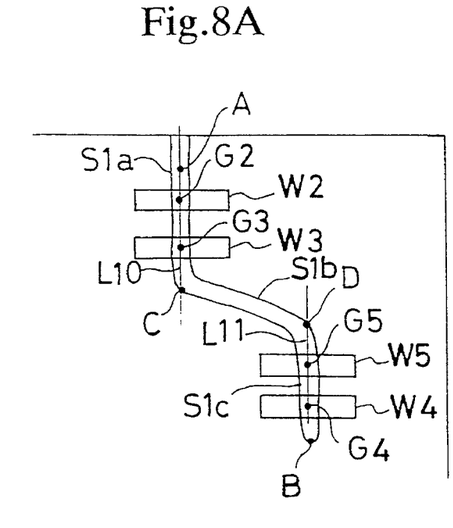
FIGS. 8A through 8C are diagrams showing an image processing for measuring the stepped edge portion of the front fender.

The position of the stepped edge portion a1 of the front fender "a" is measured in the following procedures. First, a stationary window W1 which extends over substantially the entire region of the screen is set. An upper end point A and a lower end point B, both in the Y-axis direction, of the pictured optical cutting image S1 inside this window W1 are detected. Then, as shown in FIG. 8A, windows W2, W3 are set in predetermined two positions in the first straight line portion S1a based on the upper end point A. Windows W4, W5 are also set in predetermined two positions in the second straight line portion S1c based on the lower end point B. Coordinates of centers of gravity G2 through G5 of the pictured optical cutting image S1 inside each of the windows W2 through W5 are obtained.

There are then obtained an equation of a first straight line L10 which passes through the centers of gravity G2, G3 inside the windows W2, W3, as a line to represent the first straight line portion S1a, as well as an equation of a second straight line L11 which passes through the centers of gravity G4, G5 inside the windows W4, W5, as a line to represent the second straight line portion S1c. Further, there are obtained coordinates of an end point C, on the side of the stepped portion S1b, of the pictured optical cutting image S1 which is located on the first straight line L10, as well as coordinates of an end point D, on the side of the stepped portion S1b, of the pictured optical cutting image S1 which is located on the second straight line L11.

Figure 8B:
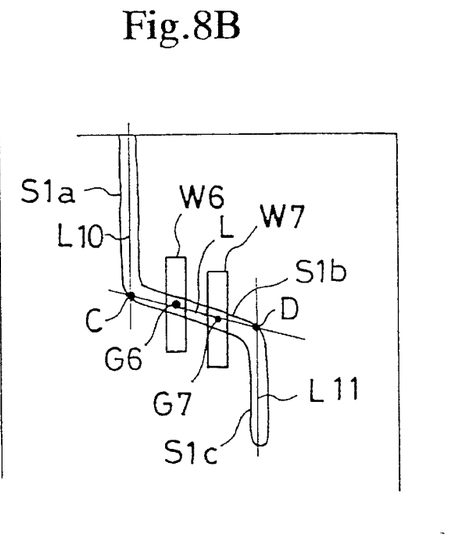

Thereafter, as shown in FIG. 8B, an equation of a segment L of a line (or a line segment L) which connects both the end points C, D is obtained. Based on this segment L of the line, windows W6, W7 are set in predetermined two positions (e.g., in positions to divide the segment L of the line into three equal sections) in the stepped portion S1b. Coordinates of the centers of gravity G6, G7 of the pictured optical cutting image S1 inside each window W6, W7 are obtained.

Figure 8C:
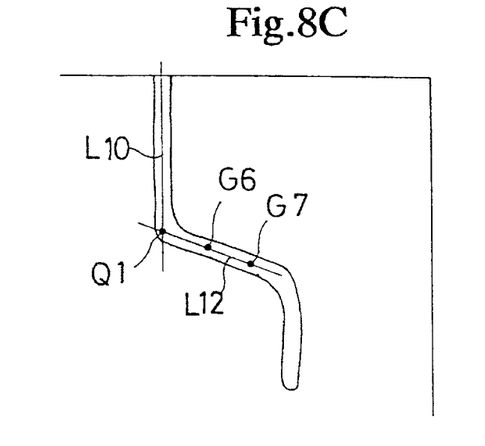

Then, as shown in FIG. 8C, there is obtained an equation of a third straight line L12 which passes through the centers of gravity G6, G7 inside the windows W6, W7, as a line to represent the stepped portion S1b. There are calculated coordinates of a crossing point Q1 between the third straight line L12 and the first straight line L10 corresponding to the first straight line portion S1a which extends in a direction away from the pictured optical cutting image S2 corresponding to the door b. This crossing point Q1 becomes a point which corresponds to a corner portion when the stepped edge portion a1 of the front fender "a" is bent without giving it a curvature. The position of the stepped edge portion a1 can thus be accurately measured without dispersion.

Figure 9:
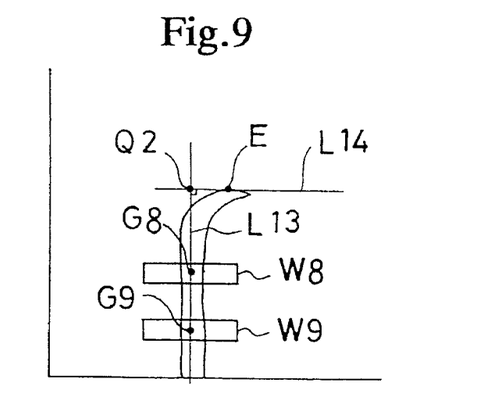
FIG. 9 is a diagram showing an image processing for measuring the edge portion of the door.

In measuring the edge portion b1 of the door b, coordinates of an end point E on the side of the edge portion of the pictured optical cutting image S2 are obtained in a manner similar to that as shown in FIG. 4. In that portion of the pictured optical cutting image S2 which extends straight, there are set windows W8, W9 in predetermined two positions based on the end point E, as shown in FIG. 9. Coordinates of the centers of gravity G8, G9 of the pictured optical cutting image S2 in each of the windows W8, W9 are obtained. There are obtained an equation of a straight line L13 which passes through both the centers of gravity G8, G9 and an equation of a straight line L14 which crosses the straight line L13 at right angles and which passes through the end point E. Coordinates of a crossing point Q2 of both the straight lines L13 and L14 are obtained as a measuring reference point corresponding to the edge portion b1.

Thereafter, from the coordinate values of each of the crossing points Q1, Q2, spatial coordinate values of that each point on the slit light plane which corresponds to each of the crossing points Q1, Q2 are obtained and, from these spatial coordinate values, the gap and the difference in level between the stepped edge portion a1 and the edge portion b1 are obtained.

When it is necessary to measure the position of stepped edge portions on both sides of the stepped surfaces of the workpiece in order to control the machining accuracy of the workpiece of stepped shape, there may be obtained the coordinates of the crossing point of the first straight line L10 and the third straight line L12 as well as the coordinates of the crossing point of the second straight line L11 and the third straight line L12.

It is readily apparent that the above-described optical measuring method meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An optical measuring method for measuring a position of an edge portion of a workpiece by using an optical measuring apparatus having a projector for radiating a slit light on the workpiece and an image sensing device for picturing an optical cutting image drawn by the slit light radiated on the workpiece, said measuring being made from a pictured optical cutting image on a screen of the image sensing device, said method comprising the steps of:

obtaining coordinates of an end point on a side of an edge portion of the pictured optical cutting image;

setting windows in predetermined two positions in that portion of the pictured optical cutting image which extends straight, thereby obtaining coordinates of respective centers of gravity of the pictured optical cutting image inside both the windows;

obtaining an equation of a first straight line which passes through both the centers of gravity and an equation of a second straight line which crosses the first straight line at right angles and which passes through the end point; and obtaining coordinates of a crossing point of both the straight lines.

2. An optical measuring method for measuring a position of a stepped edge portion of a workpiece of stepped shape by using an optical measuring apparatus having a projector for radiating a slit light on the workpiece and an image sensing device for picturing an optical cutting image drawn by the slit light radiated on the workpiece, said measuring being made from a pictured cutting image on a screen of the image sensing device, said method comprising the steps of:

setting windows in predetermined two positions respectively in a first straight line portion and a second straight line portion which extend in opposite directions with the stepped portion appearing in the pictured optical cutting image being positioned therebetween, thereby obtaining coordinates of centers of gravity of the pictured optical cutting image inside each of the windows;

obtaining an equation of a first straight line which passes through said centers of gravity inside the windows in the two positions set in the first straight line portion and an equation of a second straight line which passes through the centers of gravity inside the windows in the two positions set in the second straight line portion;

obtaining coordinates of an end point on a side of the stepped portion of the pictured optical cutting image positioned on the first straight line and coordinates of an end point on a side of the stepped portion of the pictured optical cutting image positioned on the second straight line;

setting windows in predetermined two positions in the stepped portion based on a segment of a line connecting both the end points, thereby obtaining coordinates of a center of gravity of the pictured optical cutting image inside each of the windows;

obtaining an equation of a third straight line which passes through the centers of gravity inside the windows in the two positions set in the stepped portion; and obtaining coordinates of a crossing point of at least one of the first straight line and the second straight line, and the third straight line.

3. An optical measuring method for measuring a gap and a difference in level between an edge portion of a first workpiece and an edge portion of an adjoining second workpiece by using an optical measuring apparatus having a projector for radiating a slit light so as to bridge both the edge portions, and an image sensing device for picturing optical cutting images drawn by the slit light radiated on the workpieces, said measuring being made from a first pictured optical cutting image corresponding to the first workpiece and a second pictured optical cutting image corresponding to the second workpiece respectively on a screen of the image sensing device, said method comprising:

I) a step of processing the first pictured optical cutting image comprising the sub-steps of a) obtaining coordinates of an end point on a side of the edge portion of the first pictured optical cutting image, b) setting windows in predetermined two positions in that portion of the first pictured optical cutting image which extends straight, thereby obtaining coordinates of respective centers of gravity of the first pictured optical cutting image inside both the windows, c) obtaining an equation of a first straight line which passes through both the centers of gravity and an equation of a second straight line which crosses the first straight line at right angles and which passes through the end point on the side of the edge portion of the first pictured optical cutting image, and d) obtaining coordinates of a crossing point of both the straight lines;

II) a step of processing the second pictured optical cutting image comprising the sub-steps of a) obtaining coordinates of an end point on a side of the edge portion of the second pictured optical cutting image, b) setting windows in predetermined two positions in that portion of the second pictured optical cutting image which extends straight, thereby obtaining coordinates of respective centers of gravity of the second pictured optical cutting image inside both the windows, c) obtaining an equation of a third straight line which passes through both the centers of gravity and an equation of a fourth straight line which crosses the third straight line at right angles and which passes through the end point on the side of the edge portion of the second pictured optical cutting image, and d) obtaining coordinates of a crossing point of both the straight lines; and III) a step of obtaining the gap and the difference in level from those coordinates of the crossing point which have been obtained in the step of processing the first pictured optical cutting image and those coordinates of the crossing point which have been obtained in the step of processing the second pictured optical cutting image.

4. An optical measuring method for measuring a gap and a difference in level between a stepped edge portion of a first workpiece of a stepped shape and an edge portion of an adjoining second workpiece by using an optical measuring apparatus having a projector for radiating a slit light on the workpieces so as to bridge both the stepped edge portion and the edge portion, and an image sensing device for picturing optical cutting images drawn by the slit light radiated on the workpieces, said measuring being made from a first pictured optical cutting image corresponding to the first workpiece and a second pictured optical cutting image corresponding to the second workpiece respectively on a screen of the image sensing device, said method comprising:

I) a step of processing the first pictured optical cutting image comprising the sub-steps of a) setting windows respectively in two predetermined positions in two straight line portions of the first pictured optical cutting image which extend in opposite directions with a stepped portion appearing in the first pictured optical cutting image being positioned therebetween, thereby obtaining coordinates of centers of gravity of the first pictured optical cutting image inside each of the windows, b) obtaining an equation of a first straight line which passes through both the centers of gravity inside the windows in two positions set in that one of the straight line portions which extends in a direction away from the second pictured optical cutting image and an equation of a second straight line which passes through the centers of gravity inside the windows set in two positions in the other of the straight line portions, c) obtaining coordinates of that end point on the side of the stepped portion of the first pictured optical cutting image which is positioned on the first straight line and coordinates of that end point on the side of the stepped portion of the first pictured optical cutting image which is positioned on the second straight line, d) setting windows in predetermined two positions in the stepped portion based on a segment of a line which connects both the end points, thereby obtaining coordinates of the centers of gravity of the first pictured optical cutting image inside each of the windows, e) obtaining an equation of a third straight line which passes through the centers of gravity inside those windows in the two positions which are set in the stepped portion, and f) obtaining coordinates of a crossing point of the first straight line and the third straight line;

II) a step of processing the second pictured optical cutting image comprising the sub-steps of a) obtaining coordinates of an end point on the side of the edge portion of the second pictured optical cutting image, b) setting windows in predetermined two positions that portion of the second pictured optical cutting image which extends straight, thereby obtaining coordinates of centers of gravity of the second pictured optical cutting image inside both the windows, c) obtaining an equation of a fourth straight line which passes through both the centers of gravity and an equation of a fifth straight line which crosses the fourth straight line at right angles and which passes through the end point on the side of the edge portion of the second pictured optical cutting image, and d) obtaining coordinates of a crossing point of both the straight lines; and III) obtaining the gap and the difference in level from those coordinates of the crossing point that have been obtained in the step of processing the first pictured optical cutting image and those coordinates of the crossing point that have been obtained in the step of processing the second pictured optical cutting image.

5. An optical measuring method according to claim 1, 3 or 4, wherein that coordinate axis on the screen which is substantially parallel with a longitudinal direction of the pictured optical cutting image is defined to be a first axis and a coordinate axis which crosses the first axis at right angles is defined to be a second axis, said step of obtaining coordinates of the end point on the side of the edge portion further comprises the steps of:

setting a window which extends outwards along the first axis from an end portion on the side of the edge portion of the pictured optical cutting image;

obtaining a coordinate value, in the direction of the second axis, of a center of gravity of a blank space on the outside of the pictured optical cutting image within the window as a coordinate value of the end point in the direction of the second axis; and obtaining a value by subtracting a coordinate value, in the direction of the first axis, of an outer side in the direction of the first axis of the window from a value to be obtained by doubling the coordinate value, in the direction of the first axis, of the center of gravity, said value being obtained as a coordinate value of the end point in the direction of the first axis.

* * * * *

UNITED STATES PATENT AND TRADEMARK OFFICE
CERTIFICATE OF CORRECTION

PATENT NO.: 5,608,817
DATED      : March 4, 1997
INVENTOR(S): Naoji Yamaoka, Koji Oda It is certified that error appears in the above-identified patent and that said Letters Patent is hereby corrected as shown below:

In column 13, line 29, please insert --in-- after the word "positions".

Signed and Sealed this

First Day of July, 1997

Attest:

BRUCE LEHMAN

Attesting Officer

Commissioner of Patents and Trademarks